US011365319B2

(12) United States Patent
Horiguchi

(10) Patent No.: US 11,365,319 B2
(45) Date of Patent: Jun. 21, 2022

(54) GLITTER PIGMENT, PIGMENT-CONTAINING COMPOSITION, AND PIGMENT-CONTAINING PAINTED PRODUCT

(71) Applicant: Nippon Sheet Glass Company, Limited, Tokyo (JP)

(72) Inventor: Haruko Horiguchi, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 359 days.

(21) Appl. No.: 16/464,145

(22) PCT Filed: Nov. 9, 2017

(86) PCT No.: PCT/JP2017/040460
§ 371 (c)(1),
(2) Date: May 24, 2019

(87) PCT Pub. No.: WO2018/096936
PCT Pub. Date: May 31, 2018

(65) Prior Publication Data
US 2020/0283635 A1    Sep. 10, 2020

(30) Foreign Application Priority Data
Nov. 25, 2016  (JP) .............................. JP2016-228620

(51) Int. Cl.
*C09C 1/00* (2006.01)
*C09D 7/62* (2018.01)
*C09D 7/40* (2018.01)
*B05D 5/06* (2006.01)

(52) U.S. Cl.
CPC ............ *C09C 1/0021* (2013.01); *B05D 5/067* (2013.01); *C09D 7/62* (2018.01); *C09D 7/70* (2018.01); *C01P 2004/20* (2013.01); *C01P 2004/80* (2013.01); *C01P 2006/65* (2013.01); *C01P 2006/66* (2013.01); *C09C 2200/102* (2013.01); *C09C 2200/502* (2013.01)

(58) Field of Classification Search
CPC .. B05D 5/06; B05D 5/067; B05D 7/24; C01P 2004/20; C01P 2004/80; C01P 2006/65; C01P 2006/66; C08K 2003/0831; C08K 2003/2241; C08K 7/14; C08K 9/02; C09C 1/0015; C09C 1/0021; C09C 1/0033; C09C 1/0078; C09C 2200/102; C09C 2200/1025; C09C 2200/302; C09C 2200/502; C09D 5/22; C09D 5/29; C09D 7/62; C09D 7/70; C09K 11/58
See application file for complete search history.

(56) References Cited

U.S. PATENT DOCUMENTS

2006/0223910 A1  10/2006  Bagala, Sr.
2007/0134179 A1   6/2007  Ino et al.
2009/0311209 A1  12/2009  Bujard
2015/0259538 A1   9/2015  Honeit et al.

FOREIGN PATENT DOCUMENTS

| EP | 0307771 | 3/1989 | |
| EP | 3305857 | 4/2018 | |
| JP | H0232170 | 2/1990 | |
| JP | H09255533 | 9/1997 | |
| JP | 2001031421 | 2/2001 | |
| JP | 2002155240 | 5/2002 | |
| JP | 2003012962 | 1/2003 | |
| JP | 2004204209 | 7/2004 | |
| JP | 2006176742 | 7/2006 | |
| JP | 2006299051 | 11/2006 | |
| JP | 2006299051 A * | 11/2006 | ........... C09C 1/0078 |
| JP | 2008063525 | 3/2008 | |
| JP | 2008534753 | 8/2008 | |
| JP | 2008546880 | 12/2008 | |
| JP | 2010275180 | 12/2010 | |
| JP | 2015532676 | 11/2015 | |
| WO | 2006115150 | 11/2006 | |

OTHER PUBLICATIONS

Translation of JP2006299051A 2006.*
Extended European Search Report issued for European Patent Application No. 17873845.6, dated Mar. 30, 2020, 7 pages.
International Search Report issued for International Patent Application No. PCT/JP2017/040460, dated Jan. 23, 2018, 5 pages including English translation.

* cited by examiner

*Primary Examiner* — Shuangyi Abu Ali
(74) *Attorney, Agent, or Firm* — Hamre, Schumann, Mueller & Larson, P.C.

(57) ABSTRACT

The present invention provides a glitter pigment, including: a glass flake; a titanium oxide layer formed over the glass flake; and fine gold particles deposited on the titanium oxide layer, wherein the fine gold particles include fine gold particles P2 having a particle diameter of 20 nm or more and less than 50 nm, and in a square region 2 μm on a side on a surface of the titanium oxide layer on which the fine gold particles are deposited, the number of the fine gold particles P2 is 9 or more and less than 100 and an average of distances between the fine gold particles P2 is 130 nm or more and less than 500 nm, each of the distances being a distance from one of the fine gold particles P2 to another fine gold particle P2 nearest to the one.

19 Claims, No Drawings

GLITTER PIGMENT, PIGMENT-CONTAINING COMPOSITION, AND PIGMENT-CONTAINING PAINTED PRODUCT

TECHNICAL FIELD

The present invention relates to glitter pigments, particularly relates to a glitter pigment including a glass flake as a substrate, and more particularly relates to a glitter pigment including a titanium oxide layer and fine gold particles. The present invention further relates to a composition containing a glitter pigment and to a painted product having a paint film containing a glitter pigment.

BACKGROUND ART

Glitter pigments are incorporated in products that can have added value if capable of reflecting light with sparkles like those of stars, and examples of the products include paints used for painting automobiles, inks used in writing instruments, and cosmetics such as foundations and lipsticks. The use of a glass flake as a substrate of a glitter pigment is known to provide superior appearance features such as high brightness and clear sparkles. There are also commercially-available glitter pigments that exhibit various colors, each of which is interference color caused by a titanium oxide layer formed on the substrate of the pigment.

A proposed approach for allowing a glitter pigment to exhibit a color with enhanced vividness is to exploit a color formed by surface plasmon resonance of fine metal particles. Patent Literature 1 discloses glitter pigments each produced by bringing a specific plate-like pigment (substrate pigment) selected from various ones into contact with a colloidal metal solution to deposit fine metal particles on the plate-like pigment. Example 4 of Patent Literature 1 is an example of glitter pigment production, in which fine gold particles (colloidal gold particles) are deposited on a red substrate pigment constituted by glass flakes whose surfaces are coated with a titanium oxide layer. Fine gold particles have traditionally been known as a red-color former and, in the above example, the use of colloidal gold particles enhances the vividness of the red substrate pigment. In other examples presented in Patent Literature 1 as well, fine gold particles are used as a red-color former for improving the vividness of a red color of substrate pigments (Examples 1 to 3, and 6). Fine gold particles having a particle diameter of about 10 nm are contained in the commercially-available colloidal gold solution used in examples of Patent Literature 1. Colloidal gold solutions in which fine gold particles having such a particle diameter exhibit a red color.

In Example 6 of Patent Literature 1, a glitter pigment is produced by depositing fine gold particles on a blue substrate pigment which is titanated mica. In this example as well, the color exhibited by the fine gold particles is confirmed to be red. Referring to the table which collectively shows the results for the examples, it is seen that the improvement in color vividness is smaller in Example 6 where the interference color (blue) exhibited by the substrate pigment is different from the color (red) exhibited by the fine gold particles than in other examples (Examples 1 to 5) where the interference color exhibited by the metal oxide layer is the same as the color formed by surface plasmon resonance. As can be understood from the results for examples of Patent Literature 1, the inclusion of fine gold particles in glitter pigments has been substantially limited to reddish pigments so far.

Unlike fine gold particles, fine silver particles are used as a material of pigments presenting various colors including blue and yellow colors. For example, in Example 5 of Patent Literature 1, the improvement in vividness of a yellowish substrate pigment is achieved by exploiting a yellowish color exhibited by fine silver particles. In this Example, a commercially-available colloidal silver solution is used. This colloidal silver solution contains fine silver particles (colloidal silver particles) having a particle diameter of about 5 to 7 nm. Colloidal silver solutions in which fine silver particles having such a particle diameter are dispersed appear yellow.

Patent Literature 2 discloses a pigment including: a substrate which is mica; a titanium oxide layer; and fine silver particles. In Patent Literature 2, the fine silver particles are deposited on the titanium oxide layer not by using a colloidal silver solution but by reducing silver nitrate in the presence of mica on which the titanium oxide layer is formed. Example 7 of Patent Literature 2 reports that colors such as blue and yellow colors are obtained by adjusting the amount of precipitated silver to control the particle diameter of fine silver particles.

CITATION LIST

Patent Literature

Patent Literature 1: JP 2006-299051 A
Patent Literature 2: JP H02-032170 A

SUMMARY OF INVENTION

Technical Problem

Since fine gold particles exhibit more vivid color in colloidal solution than fine silver particles and other fine metal particles, fine gold particles are thought to have higher potential also as a good non-red color former. To exhibit non-red colors in a colloidal gold solution, fine gold particles contained in the solution need to have a larger particle diameter. For example, to exhibit a blue color, the particle diameter needs to be controlled to around 70 nm or more. However, a blue color exhibited by fine gold particles having as large a particle diameter as this is duller and less vivid than a red color.

The potential of fine gold particles as a red-color former may not be fully developed let alone as a non-red color former. The present invention aims to provide a new glitter pigment improved in vividness of the reflected color owing to fine gold particles serving as an excellent color former.

Solution to Problem

The particle diameter of fine gold particles contained in a colloidal gold solution is conventionally considered a factor determining the color to be exhibited. To improve the color vividness of a substrate pigment including a titanium oxide layer based on the above idea, the particle diameter of fine gold particles should be determined so as to minimize a difference in hue angle h between the color exhibited by the fine gold particles and the interference color of the substrate pigment. For example, in Patent Literature 1, a colloidal gold solution containing fine gold particles having a particle diameter of about 10 nm is used to improve the vividness of a red color. To improve the vividness of a blue color in accordance with the above idea, fine gold particles having a particle diameter of around 70 nm or more should be used.

Surprisingly, however, it has been confirmed that the presence of fine gold particles having a particle diameter of around 20 to 50 nm greatly contributes to the improvement in vividness of a color of a glitter pigment including a titanium oxide layer, no matter which color is to be improved in vividness. Proper control of the number and arrangement of the fine gold particles having a particle diameter in this range allows fine gold particles adjacent to the titanium oxide layer to suitably exhibit their properties as a color former.

One aspect of the present invention provides a glitter pigment, including:
a glass flake;
a titanium oxide layer formed over the glass flake; and
fine gold particles deposited on the titanium oxide layer, wherein
the fine gold particles include fine gold particles P2 having a particle diameter of 20 nm or more and less than 50 nm, and
in a square region 2 μm on a side on a surface of the titanium oxide layer on which the fine gold particles are deposited, the number of the fine gold particles P2 is 9 or more and less than 100 and an average of distances between the fine gold particles P2 is 130 nm or more and less than 500 nm, each of the distances being a distance from one of the fine gold particles P2 to another fine gold particle P2 nearest to the one.

The present invention can provide, for example, a glitter pigment improved in vividness of its color compared to a conventional red glitter pigment including a titanium oxide layer and fine gold particles or, for example, a glitter pigment including a titanium oxide layer and fine gold particles and exhibiting a vivid blue or green color. That is, another aspect of the present invention provides a glitter pigment including:
a glass flake;
a titanium oxide layer formed over the glass flake; and
fine gold particles deposited on the titanium oxide layer, wherein
a reflected color, as measured using illuminant D65, is represented by a C* value of 13 or more and a h value of i) 30 or less, ii) 150 or more and 300 or less, or iii) 330 or more, in an L*C*h color system.

There are no reports on a green glitter pigment, even a green glitter pigment including fine silver particles, whose reflected color is improved in vividness. Improvement in chroma of a green reflected color is difficult. However, the present invention can also provide a glitter pigment whose green reflected color is more improved than that of conventional glitter pigments. That is, another aspect of the present invention provides a glitter pigment including:
a glass flake;
a titanium oxide layer formed over the glass flake; and
fine gold particles deposited on the titanium oxide layer, wherein
a reflected color, as measured using illuminant D65, is represented by a C* value of 8 or more and a h value of 150 or more and 210 or less, in an L*C*h color system.

The C* value of the reflected color of this glitter pigment may be in the range of 8 or more and less than 15, for example, 8.0 or more and 14.95 or less, 8 or more and less than 13, and 8.0 or more and 12.95 or less.

Advantageous Effects of Invention

The present invention provides a glitter pigment suitably delivering performance of the fine gold particles as a color former in conjunction with the titanium oxide layer and thereby improved in vividness of the reflected color.

DESCRIPTION OF EMBODIMENTS

Hereinafter, the present invention will be described in detail. The following description is not intended to limit the present invention to specific embodiments.

The term "reddish" as used herein refers to being a type of color having a h value, which represents a hue angle, of less than 45 or 315 or more in the L*C*h color system. The terms "yellowish", "greenish", and "bluish" respectively refer to being types of colors having a h value of 45 or more and less than 135, 135 or more and less than 225, and 225 or more and less than 315. The terms "red", "green", and "blue" respectively refer to colors having a h value, which represents a hue angle, of 30 or less or 330 or more, 150 or more and 210 or less, and 240 or more and 300 or less in the L*C*h color system. It should be noted that the term "blue or green" refers to a color falling within the range including intermediate colors of blue and green, the color having a h value of 150 or more and 300 or less. C* represents the chroma in the L*C*h color system. The greater C* value a color has, the more vivid the color is. A glitter pigment of the present invention is significantly improved in vividness of the reflected color when the reflected color is any of the above color types including a reddish color, particularly reddish, bluish, and greenish colors. The reflected color of the glitter pigment can be measured according to the method described in "EXAMPLES".

The terms "fine gold particles P1", "fine gold particles P2", and "fine gold particles P3" respectively refer to fine gold particles having a particle diameter of less than 20 nm, fine gold particles having a particle diameter of 20 nm or more and less than 50 nm, and fine gold particles having a particle diameter of 50 nm or more.

In the present invention, the glitter pigment includes a glass flake, a titanium oxide layer formed over the glass flake, and fine gold particles deposited on the titanium oxide layer.

Glass flakes are fine, plate-like pieces of glass which can be called scaly glass particles. The glass composition for forming the glass flakes is not particularly limited. A glass composition containing silicon dioxide as a main component and further containing other metal oxides such as aluminum oxide, calcium oxide, and sodium oxide is typically used. The term "main component" is used herein to refer to a component whose content is highest in terms of mass. Examples of glass compositions that can be used include soda-lime glass, A-glass, C-glass, E-glass, borosilicate glass, and aluminosilicate glass.

The preferred average particle diameter of the glass flakes is 3 to 500 μm, particularly 3 to 200 μm. The average particle diameter of the glass flakes is determined as a particle diameter (D50) at 50% by volume in a cumulative undersize distribution of light scattering-based particle sizes measured by laser diffractometry. The preferred thickness of the glass flakes is 0.1 to 50 μm, particularly 0.1 to 10 μm.

The glass flakes can be produced, for example, by a blowing process. The blowing process includes: melting glass cullet; discharging the molten glass continuously through a circular slit while blowing a gas such as air to the molten glass from a blowing nozzle provided inwardly of the circular slit to inflate the molten glass into a balloon; and crushing the inflated, thinned glass into flakes (scaly particles). Examples of glass flakes that can be used include commercially-available glass flakes sold as "GLASFLAKE" (registered trademark) by Nippon Sheet Glass Co., Ltd.

The surfaces of glass flakes are smoother, and more apt to reflect light without scattering, than the surfaces of crystalline particles such as mica. Additionally, glass flakes are transparent, and a glitter pigment including a glass flake as a substrate is thus less likely to produce opaque reflected color which may be observed when translucent crystalline particles are used. A glitter pigment including a glass flake as a substrate is likely to provide favorable light reflection properties leading to appearance features such as high brightness and clear sparkles. The use of glass flakes is advantageous also in achieving a high C* value.

Titanium oxide has a high refractive index and is suitable for forming a layer with desired color formation performance. Titanium oxide can have three types of crystal structures, namely the anatase-type, brookite-type, and rutile-type structures, and anatase-type titanium oxide and rutile-type titanium oxide are industrially mass-produced. The rutile-type structure is preferred among the crystal structures of titanium oxide. Rutile-type titanium oxide has a low photocatalytic activity and thus has a low impact on a matrix material such as a paint to which a glitter pigment is added. Furthermore, rutile-type titanium oxide has the highest refractive index among the three types of titanium oxide.

The formation of a rutile-type titanium oxide layer on a glass flake may be carried out according to a method disclosed, for example, in JP 2001-031421 A or JP 2003-012962 A. In the method disclosed in these patent publications, rutile-titanium oxide is precipitated on glass flakes in a solution containing a titanium compound such as titanium tetrachloride, and thus a film is formed on the glass flakes. The precipitation of rutile-type titanium oxide on the glass flakes can be caused by adding an alkaline compound or alkaline solution to the titanium compound-containing solution having a temperature of 55 to 85° C. and a pH of 1.3 or less. Preliminarily depositing tin or a tin compound on the glass flakes facilitates the precipitation of rutile-type titanium oxide. This method can be used also to form a rutile-type titanium oxide layer over glass flakes on which fine gold particles have been deposited. With the use of this method, a rutile-type titanium oxide layer can be formed without the need for heating for crystal transformation.

Glass flakes with a rutile-type titanium oxide layer formed on the surfaces thereof are sold as "METASHINE (registered trademark) Titania Coat" by Nippon Sheet Glass Co., Ltd. Such a commercially-available product may be used as a substrate pigment on which fine gold particles are to be deposited.

A substrate pigment having a titanium oxide layer exhibits a color resulting from optical interference by the layer, and the color varies depending on the thickness of the layer. A titanium oxide layer formed on glass flakes presents a yellow color at a thickness of around 100 nm, a red color at a thickness of around 130 nm, a blue color at a thickness of around 160 nm, and a green color at a thickness of around 175 nm. Depending on the layer formation conditions and other factors, the color produced by the titanium oxide layer may slightly vary even when the thickness of the layer is unchanged. To produce a yellowish color, it is preferable for the titanium oxide layer to have a thickness in the range of 80 nm or more and less than 115 nm. To produce a reddish color, it is preferable for the titanium oxide layer to have a thickness in the range of 115 nm or more and less than 150 nm. To produce a bluish color, it is preferable for the titanium oxide layer to have a thickness in the range of 150 to 165 nm. To produce a greenish color, it is preferable for the titanium oxide layer to have a thickness in the range of more than 165 nm and 185 nm or less. To obtain a blue or green glitter pigment, it is preferable for the titanium oxide layer to have a thickness in the range of 150 to 185 nm and particularly in the range of 155 to 180 nm.

Fine gold particles can be deposited on the surface of a titanium oxide layer by bringing a colloidal gold solution into contact with the glass flakes with the titanium oxide layer formed thereon. For example, the colloidal gold solution can be prepared by reducing a gold compound such as chloroauric acid in a solution.

The vivid red color of fine gold particles is due to surface plasmon resonance. Fine gold particles (colloidal gold particles) contained in a colloidal gold solution as prepared by the above known method typically have an average particle diameter of around 5 to 40 nm, particularly around 5 to 30 nm, and present a red color. However, it is also possible to obtain colloidal gold particles having an average particle diameter of around 1 to 5 nm by using a different method. As described previously, when colloidal gold particles aggregate into larger-size particles in a colloidal gold solution, the absorption wavelength shifts to longer wavelengths, so that the color exhibited by the particles changes from red to pale blue or purple. The average particle diameter of fine gold particles (colloidal gold particles) in a colloidal gold solution can be measured using a transmission electron microscope (TEM). In this case, it is recommended that the average particle diameter of the fine gold particles be determined by measuring the particle diameters of, for example, 10 to 20 fine gold particles or preferably 100 fine gold particles and calculating the average of the measured values.

The color vividness of a substrate pigment constituted by a glass flake with a titanium oxide layer formed thereon can be improved by appropriately arranging fine gold particles having a proper particle diameter, regardless of whether or not the exhibited color is red. This improvement can be achieved, for example, by depositing fine gold particles onto a titanium oxide layer of a substrate pigment from a colloidal gold solution containing the fine gold particles and then adequately heating the substrate pigment. The fine gold particles are preferably dispersed in the colloidal gold solution in a manner allowing aggregation of the fine gold particles by heating.

Commercially-available colloidal gold solutions commonly contain a stabilizer (protective agent) having a high anti-aggregation effect at a concentration sufficient to satisfactorily prevent aggregation of fine gold particles, and are thus inappropriate for the improvement described above. To commercially-available colloidal gold solutions as used in Patent Literature 1 or as used in Comparative Examples of the present invention, a stabilizer (protective agent) having a high anti-aggregation effect is commonly added at a concentration sufficient to prevent fine gold particles from easily aggregating so as to keep the colloidal gold particles dispersed. Typical examples of the stabilizer include casein, gelatin, polyvinyl alcohol (PVA), polyvinylpyrrolidone (PVP), and polyethylene glycol (PEG). The reason of the addition is that a colloidal gold solution containing easily aggregating fine gold particles has a disadvantage in that the color is changeable. Fine gold particles in glitter pigments are conventionally not used to exhibit colors other than a red color, and even a red color exhibited has insufficient vividness. One reason of this is thought to be the presence of a stabilizer having a high anti-aggregation effect and limiting a change in the aggregation state of the fine gold particles.

To facilitate a change in the aggregation state of fine gold particles and keep the fine gold particles dispersed, a suitable stabilizer is desirably added at a suitable concentration to a colloidal gold solution. Examples of the stabilizer having a suitable anti-aggregation effect include citric acids and their salts. It is difficult to uniformly define the suitable stabilizer concentration, which depends on the type of the stabilizer, concentration of fine gold particles, and the like. The molar ratio of, for example, a citric acid or its salt to gold may be in the range of 1 to 9 and preferably 1.5 to 3. At this concentration, fine gold particles (colloidal gold particles) can be stabilized in the colloidal gold solution to a degree where heating can change the aggregation state of the fine gold particles. The citric acids and their salts also serve as a reducing agent for reducing a gold-containing salt in a solution to yield fine gold particles.

The average particle diameter of the fine gold particles contained in the colloidal gold solution with which the titanium oxide layer or glass flake is brought into contact is not particularly limited, and is desirably 1 nm or more, more desirably 3 nm or more, and particularly desirably 5 nm or more, and desirably 30 nm or less, more desirably 20 nm or less, and particularly desirably 15 nm or less, and may be 10 nm or less. The fine gold particles having a particle diameter in this range have an absorption peak in the wavelength range of 510 to 535 nm due to surface plasmon resonance and appear reddish in the colloidal gold solution. However, the use of the colloidal gold solution in which the fine gold particles having an average particle diameter in the above range are dispersed is possible and appropriate to improve the vividness of a non-reddish reflected color.

Before the deposition of the fine gold particles, the colloidal gold solution is preferably adjusted to be acidic, specifically to have a pH of 1 to 5 and particularly 2 to 4. If the pH of the colloidal gold solution is alkaline, repulsion owing to negative surface charge of the fine gold particles (colloidal gold particles) decreases and the fine gold particles are likely to form too large an aggregate.

Extensive investigation of glitter pigments in terms of the vividness of reflected color and the particle diameter and dispersion state of fine gold particles has revealed that the fine gold particles P2 having a particle diameter of 20 nm or more and less than 50 nm greatly contribute to the improvement in vividness, namely an increase in a C* value in the L*C*h color system, of reflected color, no matter what color the reflected color is. Relative to this contribution, the fine gold particles P1 having a particle diameter of less than 20 nm and fine gold particles P3 having a particle diameter of 50 nm or more make a small contribution to the improvement in color vividness.

The great contribution of the fine gold particles P2 also to the improvement in vividness of non-reddish reflected colors is a result unexpected from the fact that the fine gold particles P2 exhibit a reddish color in the colloidal gold solution. This result is thought to be attributable to the relative positional relationship between the fine gold particles and titanium oxide crystals included in the titanium oxide layer. For example, a fine gold particle existing on a crystal grain of titanium oxide and a fine gold particle existing at a grain boundary between crystal grains of titanium oxide have a difference in the degree of contact with titanium oxide, namely, the size of the interface between gold and titanium oxide, even when having the same particle diameter. Light absorption associated with surface plasmon resonance on these fine gold particles occurs at different light absorption wavelengths because of a great influence of the type of a dielectric adjacent to a metal. In the above case, the fine gold particle existing at the grain boundary between the crystal grains of titanium oxide and surrounded by titanium oxide having a relatively high refractive index exhibits a shorter-wavelength color in the visible region than a fine gold particle in a colloidal gold solution or on a crystal grain.

The fine gold particles can be arranged to be at a grain boundary between crystal grains of titanium oxide by providing the fine gold particles having an average particle diameter in the above range from a colloidal gold solution containing the fine gold particles dispersed and then heating these fine gold particles to provide thermal energy so as to allow the fine gold particles to aggregate and move to the grain boundary, which is a relatively stable position, between crystal grains. It is thought that by further heating in this state, sintering of the crystal grains of titanium oxide may progress to bury the fine gold particles P2 in the grain boundary. It is inferred that the fine gold particles P2 have a size suitable for embedding into the grain boundary between the crystal grains of titanium oxide and therefore make a great contribution to the improvement in vividness of reflected color at wavelengths below a wavelength region of a red color.

From the perspective of the normal grain boundary size, the fine gold particles P3 are slightly too large. Additionally, most, for example, 90% or more of fine gold particles provided from a commercially-available colloidal gold solution are likely to be the fine gold particles P1 even after the heating. When aggregation and movement of the fine gold particles are limited to this degree, only a small amount of the fine gold particles moves to the grain boundary between the crystal grains of titanium oxide and exhibits a color on the short-wavelength side of the visible region.

The above-described reason, however, cannot explain the great contribution of the fine gold particles P2 also to the improvement in vividness of a red reflected color. The relatively great improvement in vividness of a reddish reflected color by the fine gold particles P2 is presumably attributed to the fact that crystallites of the fine gold particles P2 are larger than those of the fine gold particles P1 as a result of the difference in particle diameter. However, one factor may be that the hue angle h of a reddish color formed by surface plasmon resonance of the fine gold particles P2 is closer to the hue angle h of the reddish interference color of the titanium oxide layer than to the hue angle h of the fine gold particles P1. Another possible factor may be that on the titanium oxide layer, the coefficient of light absorption associated with surface plasmon resonance of the fine gold particles P2 greatly exceeds the coefficient of light absorption of the fine gold particles P1. In both cases, when a red color should be exhibited, it is desirable that the heating temperature be not too high so that the fine gold particles P2 will move to the grain boundary between the crystal grains of titanium oxide but will not be buried therein.

To improve the chroma of the reflected color, the appropriate number of the fine gold particles P2 is a predetermined number or more, specifically 9 or more, in a square region 2 μm on a side on the surface of the titanium oxide layer (condition I). The number of the fine gold particles P2 is desirably 12 or more, more desirably 13 or more, particularly desirably 15 or more, and more particularly desirably 16 or more. There is no need for too many fine gold particles P2, and the number of the fine gold particles P2 may be less than 100 in the above region. The number of the fine gold particles P2 may be less than 70, even less than 50, and particularly less than 30.

Additionally, it has been confirmed that to improve the chroma of the reflected color, the distribution of the fine gold particles P2 on the surface of the titanium oxide layer is desirably not too uneven, i.e., the shortest distance between the fine gold particles P2 is desirably not too short. Specifically, it is appropriate that an average of distances between the fine gold particles P2 be 130 nm or more and less than 500 nm (condition II). Each of the distances is a distance from one of the fine gold particles P2 to another fine gold particle P2 nearest to the one, or each of the distances is the shortest distance (hereinafter referred to as "shortest P2-to-P2 distance") between the fine gold particles P2 and measured for each of the fine gold particles P2, in a square region 2 μm on a side on the surface of the titanium oxide layer. The average of the shortest P2-to-P2 distances may be 150 nm or more, 170 nm or more, even 174 nm or more, particularly 180 nm or more, and more particularly 200 nm or more. It can be thought that in the case where the condition II is satisfied and the distribution of the fine gold particles P2 is not too uneven, the number of the fine gold particles P2 existing at the grain boundary between the crystal grains of titanium oxide is less likely to be limited. Additionally, this is thought to be a case where the fine gold particles P2 evenly exist and efficiently exhibit a color such as red.

Assuming that the condition I is satisfied, the fine gold particles P2 having an average of the shortest P2-to-P2 distances of about 130 nm or more can be considered not to be distributed too unevenly. The average of the shortest P2-to-P2 distances may be as small as less than 400 nm or even less than about 350 nm so that there will be the appropriate number of the fine gold particles P2. The shortest P2-to-P2 distance is measured for each of the fine gold particles P2. Therefore, for example, when there are 10 fine gold particles P2 in the above region, each of the 10 fine gold particles P2 is measured and the sum of the 10 measured values is divided by 10 to determine the average of the shortest P2-to-P2 distances.

To improve the chroma of the reflected color, it is desirable that in a 2 μm square region on the surface of the titanium oxide layer, the fine gold particles P1 having a particle diameter of less than 20 nm exist along with the fine gold particles P2 or along with the fine gold particles P2 and P3 and that in a 2 μm square region on the surface of the titanium oxide layer, the number of the fine gold particles P1 be less than 100 and larger than 60% of the number of the fine gold particles P2 in the same region (condition III). The number of the fine gold particles P1 in the above region may be less than 80. The number of the fine gold particles P1 may be more than 70% of the number of the fine gold particles P2, more than 80% of the number of the fine gold particles P2, or more than the number (more than 100%) of the fine gold particles P2. Presence of too many fine gold particles P1 is not suitable to improve the chroma of the reflected color. However, in a preferred embodiment in which the fine gold particles P2 are yielded from a portion of the fine gold particles P1 by the aggregation caused by heating, the above amount of the fine gold particles P1 remain in the above region.

To improve the chroma of the reflected color, it is desirable that in a 2 μm square region on the surface of the titanium oxide layer, the number of the fine gold particles P3 having a particle diameter of 50 nm or more be less than 40% of the sum of the number of the fine gold particles P1 and the number of the fine gold particles P2 in the same region (condition IV). The number of the fine gold particles P3 may be less than 30% of the sum of the number of the fine gold particles P1 and the number of the fine gold particles P2.

To improve the chroma of the reflected color, it is desirable that in a 2 μm square region on the surface of the titanium oxide layer, the number of the fine gold particles P3 having a particle diameter of 50 nm or more be less than 120% of the number of the fine gold particles P2 in the same region (condition V). The number of the fine gold particles P3 may be 100% or less of the number of the fine gold particles P2. For example, if the heat-caused aggregation of the fine gold particles proceeds too far, too many fine gold particles P3 are yielded.

In an embodiment of the present invention, the glitter pigment fulfills the conditions I and II and at least one, preferably any two or more of the conditions III to V. Fine gold particles contained in a commercially-available colloidal gold solution commonly have uniform particle diameters and a particle size distribution with a sharp peak near the average particle diameter, and the average particle diameter is typically adjusted to about 10 nm. Therefore, just depositing fine gold particles from a commercially-available colloidal gold solution on a substrate pigment cannot possibly allow the fine gold particles to satisfy the conditions I and II and also at least one of the conditions III to V. Depositing fine gold particles from a commercially-available colloidal gold solution so as to satisfy the condition I makes the shortest P2-to-P2 distance too short to satisfy the condition II.

The vividness of the reflected color of a substrate pigment which is a glass flake with a titanium oxide layer formed thereon, as expressed by a C* value in the L*C*h color system, is about 8 or less and is, for example, in the range of 4 to 8. By exploiting potentially excellent color formation performance of the fine gold particles, the vividness of the reflected color of a glitter pigment including a substrate pigment of any color can be greatly increased, as expressed by a C* value, to 13 or more. An embodiment of the present invention provides a blue or green glitter pigment presenting a reflected color whose vividness, as expressed by a C* value, reaches 15 or more, even 20 or more, or, in some cases, 23 or more, particularly 25 or more, more particularly 30 or more, or, in some cases, 32 or more. Moreover, another embodiment of the present invention provides a red glitter pigment presenting a reflected color whose vividness, as expressed by a C* value, reaches 13 or more, even 20 or more, particularly 23 or more, or more particularly 23.5 or more. Furthermore, yet another embodiment of the present invention provides a green glitter pigment presenting a reflected color whose vividness, as expressed by a C* value, is 8 or more, even 10 or more, particularly 12 or more, or, for example, 8.0 to 14.95 or 8.3 to 14.9.

Application of a conventional method in which fine gold particles presenting a red color are provided from a commercially-available colloidal gold solution to deposit on the surface achieves a glitter pigment having a reflected color whose vividness, as expressed by a C* value, is less than 10. The increase in vividness of a red color up to or above a C* value of 13 or, in some cases, up to or above 23 deserves special attention. No appropriate approach for enhancing the color vividness of a substrate pigment presenting a blue or green color attributed to a titanium oxide layer has been found before, unlike for red substrate pigments. The increase in C* value (ΔC*) resulting from the deposition and heating of the fine gold particles can be 10 or more, even 20 or more, or, particularly, 25 or more.

For blue and green colors, the color vividness is improved more greatly by the use of a blue substrate pigment than by the use of a green substrate pigment. For a blue color (h: 225 to 300), it is inferred that the interference color caused by the titanium oxide layer and the color exhibited by the fine gold particles sharing an interface with the crystal grains of titanium oxide are quite similar and because of the similarity, the color vividness of the glitter pigment may be greatly increased up to or above a C* value of 25. As described previously, improvement of the chroma of a green substrate pigment, however, has been difficult. A green glitter pigment according to the present invention has no less utility value than a blue glitter pigment prepared in the same manner even if the green glitter pigment is inferior in chroma to the blue glitter pigment. As shown in Examples described later, the C* value of a green glitter pigment is only about 50% to 65% relative to the C* value of a blue glitter pigment obtained by the use of the same content of included gold (it has been confirmed that a green glitter pigment obtained by the use of a content of included gold of 0.04% has a C* value of 8.4, which is about 55% of the C* value of the corresponding blue glitter pigment (Example 6) obtained by the use of the same content of included gold and having a C* value of 15.3). Even with this level of chroma, a green glitter pigment exhibits an unprecedentedly vivid reflected color.

To change the aggregation state of the fine gold particles, the heating of the substrate pigment on which the fine gold particles are deposited is preferably carried out without allowing a film other than the titanium oxide layer serving as a layer for causing the interference color to make contact with the fine gold particles. This is because an amorphous protective layer, such as a silica layer, coating the fine gold particles inhibits the heat from changing the aggregation state of the fine gold particles. The glitter pigment preferably has no silica layer having direct contact with the fine gold particles.

The preferred heating temperature for the substrate pigment having the fine gold particles deposited thereon is commonly 80° C. or above, and is specifically 100 to 900° C., even 350 to 750° C., or particularly 500 to 700° C. The preferred heating time for the substrate pigment having the fine gold particles deposited thereon is typically 5 minutes to 3 hours, or particularly 30 minutes to 2.5 hours. For low-temperature heating performed also for drying, the heating time may be longer. Obviously, the heating temperature and heating time may be appropriately adjusted using the degree of improvement in color vividness as a measure.

It is desirable that the heating temperature and heating time be adjusted appropriately depending on the reflected color whose chroma is to be improved. For example, to improve the chroma of a reddish reflected color, the appropriate heating temperature is 120 to 200° C., and particularly 150 to 200° C. In this case, the heating time may be, for example, in the range of 5 to 20 hours, though depending on the heating temperature. Moreover, to improve the chroma of a non-red reflected color, the appropriate heating temperature is 350 to 900° C., and particularly 500 to 700° C. In this case, the heating time may be, for example, in the range of 30 minutes to 2.5 hours, though depending on the heating temperature.

When the heating temperature is high, the fine gold particles have great crystallite diameters. The higher the temperature is, the greater the amount of the increase in crystallite diameter is, and the vividness of reflected color tends to be enhanced with an increase in crystallite diameter. This tendency is noticeable when reflected color is other than a red color, particularly when the glitter pigment presents a blue or green color. In the glitter pigment of the present invention, the crystallite diameter of the fine gold particles is 12 nm or more and preferably 14 nm or more, and may in some cases be 20 nm or more. The upper limit of the crystallite diameter of the fine gold particles is not particularly limited. For example, the crystallite diameter is 100 nm or less or even 50 nm or less.

The content of the fine gold particles may be adjusted depending on the desired color to be exhibited and is, for example, 0.01 to 3%, preferably 0.03 to 2%, and more preferably 0.05 to 1%. The term "content" as used herein refers to the ratio of the mass of the fine gold particles to the total mass of the glass flake, titanium oxide layer, and fine gold particles in the glitter pigment.

The glitter pigment according to the present invention exhibits a vivid color when incorporated in various compositions. In another aspect, the present invention provides a pigment-containing composition containing the glitter pigment according to the present invention. An example of the pigment-containing composition is at least one selected from a paint, ink, cosmetic, and resin composition. An example of the resin composition is a molded product of artificial marble.

In still another aspect, the present invention provides a pigment-containing painted product containing a substrate material and a paint film formed on the substrate material, the paint film containing the glitter pigment according to the present invention. The pigment-containing painted product may be painted paper. In this case, the substrate material is paper. The substrate material is not limited to paper, and may be a metal, resin, ceramic, or another material. The paint film may be composed of the pigment-containing composition according to the present invention. The paint film may be formed by applying the pigment-containing composition according to the present invention onto the substrate material.

Preferred embodiments and specific examples of the pigment-containing composition and pigment-containing painted product are as disclosed in publications of patent applications previously filed by the applicant of the present invention (JP 2008-063525 A, for example), and such compositions and painted products themselves are well-known. Descriptions of the composition and painted product are therefore omitted herein, and only the cosmetic will be described hereinafter.

Examples of the cosmetic include facial cosmetics, makeup cosmetics, and hair cosmetics. In particular, the glitter pigment according to the present embodiment is especially suitable for use in makeup cosmetics such as eye shadow, nail enamel, eyeliner, mascara, lipstick, and fancy powder. The form of the cosmetic is not particularly limited, and the cosmetic may be, for example, in the form of a powder, cake, pencil, stick, ointment, liquid, emulsion, or cream.

Reflected light from a pigment-containing composition or pigment-containing painted product containing a glitter pigment according to a preferred embodiment of the present invention shows a large increase in so-called "highlight" and a large decrease in so-called "shade" compared to reflected light from a composition or painted product prepared by adding a substrate pigment. Accordingly, the pigment-containing composition or pigment-containing painted product according to the preferred embodiment of the present invention presents a more accentuated metallic appearance. The decrease in shade is presumably because rearrangement of the fine gold particles leads to increased uniformity of the direction of light reflection from the particles and therefore to reduced diffuse reflection.

EXAMPLES

Example 1: Red Glitter Pigment

Preparation of Colloidal Gold Solution

An amount of 100 g of chloroauric acid tetrahydrate (a powder, manufactured by Ohura Precious Metal Industry Co., ltd. and having a purity of 99.0% or more) was diluted with 480 g of water to prepare a 17.24 wt % chloroauric acid solution. Additionally, sodium citrate (manufactured by Nacalai Tesque Inc.) was diluted with pure water to prepare a 10 wt % sodium citrate solution. A 1 L round-bottom flask was charged with 2.00 g of the 17.24 wt % chloroauric acid solution and 994.99 g of pure water, and the contents of the flask were heated under reflux at a constant temperature of 100° C. for 30 minutes. Subsequently, 3.01 g of the 10 wt % sodium citrate solution was added to the round-bottom flask, and the contents of the flask were further heated under reflux at a constant temperature of 100° C. for 30 minutes, after which the round-bottom flask was cooled to room temperature in water, giving a colloidal gold solution. The primary particle diameters of the fine gold particles (colloidal gold particles) thus obtained were measured with a transmission electron microscope (TEM), and the average particle diameter of the particles was calculated. The average particle diameter of the colloidal gold particles was in the range of 5 to 10 nm.

Deposition of Fine Gold Particles on Substrate Pigment

An amount of 800 g of the colloidal gold solution prepared by the above synthesis procedure and 50 g of a red substrate pigment were placed in a 1 L beaker. The substrate pigment used was "METASHINE MT1080RR" (manufactured by Nippon Sheet Glass Co., Ltd.) constituted by glass flakes coated with a 130-nm-thick rutile-type titanium oxide layer. The glass flakes constituting this substrate pigment and the other substrate pigments used below have a particle diameter of about 80 μm and a thickness of about 1.3 μm. While the colloidal gold solution and substrate pigment were stirred with a stirring blade in the beaker, hydrochloric acid was added to adjust the pH to 2 to 4. The stirring was continued for 10 minutes. Afterwards, a glitter pigment was separated from the supernatant by filtration, and the glitter pigment was heat-treated at 180° C. for 12 hours. A glitter pigment exhibiting a vivid red color was thus obtained.

Example 2: Red Glitter Pigment

A glitter pigment exhibiting a vivid red color was obtained in the same manner as in Example 1, except that 3060 g of a colloidal gold solution prepared in the same manner as in Example 1 was used.

Example 3: Red Glitter Pigment

A glitter pigment exhibiting a vivid red color was obtained in the same manner as in Example 1, except that 132 g of a colloidal gold solution prepared in the same manner as in Example 1 was used.

Example 4: Blue Glitter Pigment

An amount of 800 g of a colloidal gold solution prepared in the same manner as in Example 1 and 50 g of a blue substrate pigment were placed in a 1 L beaker. The substrate pigment used was "METASHINE MT1080RB" (manufactured by Nippon Sheet Glass Co., Ltd.) constituted by glass flakes coated with a 160-nm-thick rutile-type titanium oxide layer. While the colloidal gold solution and substrate pigment were stirred with a stirring blade in the beaker, hydrochloric acid was added to adjust the pH to 2 to 4. The stirring was continued for 10 minutes. Afterwards, a glitter pigment was separated from the supernatant by filtration, and the glitter pigment was heat-treated at 700° C. for 2 hours. A glitter pigment exhibiting a vivid blue color was thus obtained.

Example 5: Blue Glitter Pigment

A glitter pigment exhibiting a vivid blue color was obtained in the same manner as in Example 4, except that 3060 g of a colloidal gold solution prepared in the same manner as in Example 1 was used.

Example 6: Blue Glitter Pigment

A glitter pigment exhibiting a vivid blue color was obtained in the same manner as in Example 4, except that 40 g of a colloidal gold solution prepared in the same manner as in Example 1 was used.

Example 7: Green Glitter Pigment

An amount of 800 g of a colloidal gold solution prepared in the same manner as in Example 1 and 50 g of a green substrate pigment were placed in a 1 L beaker. The substrate pigment used was "METASHINE MT1080RG" (manufactured by Nippon Sheet Glass Co., Ltd.) constituted by glass flakes coated with a 175-nm-thick rutile-type titanium oxide layer. While the colloidal gold solution and substrate pigment were stirred with a stirring blade in the beaker, hydrochloric acid was added to adjust the pH to 2 to 4. The stirring was continued for 10 minutes. Afterwards, a glitter pigment was separated from the supernatant by filtration, and the glitter pigment was heat-treated at 700° C. for 2 hours. A glitter pigment exhibiting a vivid green color was thus obtained.

Example 8: Green Glitter Pigment

A glitter pigment exhibiting a vivid green color was obtained in the same manner as in Example 7, except that 3060 g of a colloidal gold solution prepared in the same manner as in Example 1 was used.

Comparative Example 1: Red Glitter Pigment

A glitter pigment exhibiting a vivid red color was obtained in the same manner as in Example 1, except that a mixture of 17.6 g of a colloidal gold solution, "EMGC10" manufactured by BBI Solutions, and 20 g of pure water was used as a colloidal gold solution and that the amount of the red substrate pigment was 2 g. In this Comparative Example and Comparative Example 3, the amounts of the fine gold particles with respect to the substrate pigments are the same as those in Examples 3 and 6.

Comparative Example 2: Red Glitter Pigment

Preparation of Colloidal Gold Solution

In a beaker were placed 133.5 g of 3-amino-1-propanol (manufactured by Tokyo Chemical Industry Co., Ltd.), 58.0 g of pure water, and 8.4 g of casein (manufactured by KISHIDA CHEMICAL Co., Ltd.), which were stirred. To the beaker was added 522.4 g of a 30.8 wt % chloroauric acid solution, and the contents of the beaker were stirred. Subsequently, a mixture of 0.7 g of dimethylamine borane (manufactured by Wako Pure Chemical Industries, Ltd.) and 174.1 g of pure water was added. A 30-minute stirring of the contents gave a colloidal gold solution (concentration of gold: 10.2%). The primary particle diameters of the fine gold particles (colloidal gold particles) thus obtained were measured with a transmission electron microscope (TEM), and the average particle diameter of the particles was calculated. The average particle diameter of the colloidal gold particles was in the range of 5 to 10 nm.

Deposition of Fine Gold Particles on Substrate Pigment

An amount of 0.196 g of the colloidal gold solution prepared by the above synthesis procedure, 50 g of pure water, and 2 g of a red substrate pigment ("METASHINE MC1080RR", manufactured by Nippon Sheet Glass Co., Ltd.) were placed in a beaker. While the colloidal gold solution and substrate pigment were stirred with a stirring blade in the beaker, sodium hydroxide was added to adjust the pH to 10.7 to 11.3. The stirring was continued for 10 minutes. Afterwards, a glitter pigment was separated from the supernatant by filtration, dried at 100° C. for 1 hour, and then heat-treated at 700° C. for 1 hour to obtain a glitter pigment exhibiting a red color.

Comparative Example 3: Blue Glitter Pigment

A glitter pigment exhibiting a blue color was obtained in the same manner as in Example 4, except that a mixture of 17.6 g of a colloidal gold solution, "EMGC10" manufactured by BBI Solutions, and 20 g of pure water was used as a colloidal gold solution and that the amount of the blue substrate pigment was 2 g.

Comparative Example 4: Blue Glitter Pigment

A glitter pigment exhibiting a blue color was obtained in the same manner as in Example 4, except that a colloidal gold solution presenting a violet color and obtained by adding an aqueous solution of sodium hydroxide to 132 g of a colloidal gold solution prepared in the same manner as in Example 1 to adjust the pH of the colloidal gold solution to be 11 was used as a colloidal gold solution.

Comparative Example 5: Green Glitter Pigment

A glitter pigment exhibiting a green color was obtained in the same manner as in Example 7, except that a colloidal gold solution presenting a violet color and obtained by adding an aqueous solution of sodium hydroxide to 132 g of a colloidal gold solution prepared in the same manner as in Example 1 to adjust the pH of the colloidal gold solution to be 11 was used as a colloidal gold solution.

(Color measurement of powders)

Color measurement of the glitter pigment powders obtained in Example and Comparative Examples and the substrate pigment powders employed in Examples and Comparative Examples was carried out using a spectrocolorimeter, "CM-5" (manufactured by KONICA MINOLTA, INC.). Each of the powders was put in a small petri dish (dia. =3 mm) when subjected to the color measurement. The color measurement was carried out by SCE (specular component excluded) method using illuminant D65 as a light source at a viewing angle of 2°.

(Evaluation of Dispersibility of Fine Gold Particles)

Backscattered electron images of the glitter pigments were obtained using a scanning electron microscope to evaluate the dispersibility of the fine gold particles. Observation was carried out at an observation magnification of 20000 times, an accelerating voltage of 20 kV, and an incline of each sample of 0° using a field emission scanning electron microscope, "S-4700" (manufactured by Hitachi High-Technologies Corporation). Each observation sample was fixed to an electrically conductive double-faced tape and then subjected to Pt-Pd coating for electrical conduction. Images were taken at four sites per observation sample at the above magnification. A square frame 2 µm on a side was set anywhere in each site and the fine gold particles in the frame were counted. When counted, the fine gold particles were classified based on the particle diameter: that is, particles having a particle diameter of less than 20 nm were classified as fine gold particles P1; particles having a particle diameter of 20 nm or more and less than 50 nm were classified as fine gold particles P2; and particles having a particle diameter of 50 nm or more were classified as fine gold particles P3. The numbers obtained for the four sites were averaged, and the averages were employed as the numbers of the fine gold particles P1 to P3 in a 2 µm square range.

Additionally, in each of the frames, the distance (shortest P2-to-P2 distance) from a fine gold particle P2 to its nearest fine gold particle P2 was measured for every fine gold particle P2 and the average of the measured values was determined. The averages determined for the four sites were further averaged to employ the resultant value as the average shortest P2-to-P2 distance.

The measurement results for Examples and Comparative Examples are shown in Table 1.

TABLE 1

|  | Titanium oxide layer | | Content of included gold (%) | Chroma C* | Hue angle h | Number of fine gold particles | | | Average shortest P2-to-P2 distance (nm) |
| --- | --- | --- | --- | --- | --- | --- | --- | --- | --- |
|  | Layer thickness (nm) | Interference color |  |  |  | P1 | P2 | P3 |  |
| Example 1 | 130 | Red | 0.26 | 23.6 | 8.0 | 27 | 17 | 1 | 308.3 |
| Example 2 | 130 | Red | 1.00 | 23.0 | 353.3 | 50 | 15 | 15 | 220.8 |
| Example 3 | 130 | Red | 0.04 | 14.5 | 16.7 | 10 | 13 | 1 | 172.8 |
| Comparative Example 1 | 130 | Red | 0.04 | 8.8 | 11.9 | 107 | 2 | 2 | 376.1 |

TABLE 1-continued

| | Titanium oxide layer | | Content of included gold (%) | Chroma C* | Hue angle h | Number of fine gold particles | | | Average shortest P2-to-P2 distance (nm) |
| | Layer thickness (nm) | Interference color | | | | P1 | P2 | P3 | |
|---|---|---|---|---|---|---|---|---|---|
| Comparative Example 2 | 130 | Red | 1.00 | 10.2 | 5.02 | 5 | 5 | 10 | 83.2 |
| Example 4 | 160 | Blue | 0.26 | 23.2 | 297.1 | 26 | 17 | 2 | 335.6 |
| Example 5 | 160 | Blue | 1.00 | 33.9 | 270.1 | 63 | 16 | 8 | 174.6 |
| Example 6 | 160 | Blue | 0.04 | 15.3 | 282.9 | 8 | 9 | 2 | 374.5 |
| Comparative Example 3 | 160 | Blue | 0.04 | 9.0 | 296.4 | 282 | 11 | 11 | 92.4 |
| Comparative Example 4 | 160 | Blue | 0.04 | 6.4 | 272.8 | 14 | 6 | 10 | 291.5 |
| Example 7 | 175 | Green | 0.26 | 14.9 | 165.6 | 31 | 14 | 1 | 381.7 |
| Example 8 | 175 | Green | 1.00 | 17.3 | 175.2 | 68 | 22 | 13 | 179.9 |
| Comparative Example 5 | 175 | Green | 0.26 | 6.2 | 160.1 | 5 | 3 | 6 | 584.1 |

In Comparative Examples 1, 2, 4, and 5, the number of the fine gold particles P2 is less than 9. In Comparative Example 3, the number of the fine gold particles P2 exceeds 9, but the average of the shortest P2-to-P2 distances is no more than 130 nm, namely about 90 nm. Comparative Examples 1 to 5 fail to achieve either or both the number of the fine gold particles P2 of 9 to 100 and the average of the shortest P2-to-P2 distances of 130 to 500 nm. The cause of this failure is that, in Comparative Examples 1 and 3, the commercially-available colloidal gold solution containing a stabilizer (protective agent) having a high anti-aggregation effect at a concentration sufficient to satisfactorily prevent aggregation of the fine gold particles is used, and, in Comparative Examples 2, 4, and 5, the colloidal gold solutions brought into contact with the substrate pigments are alkaline. When each of Comparative Examples 1 to 5 is compared to Examples where the color type of the glitter pigments is the same as that in the comparative example, it is seen that the chroma C* of the glitter pigments is lower than that of the glitter pigments of Examples including 9 to 100 fine gold particles P2 and having an average shortest P2-to-P2 distance of 130 to 500 nm. These results clearly show that the conventional methods (e.g., examples, such as Example 4, of Patent Literature 1) cannot achieve high chroma C.

The invention claimed is:

1. A glitter pigment, comprising:
a glass flake;
a titanium oxide layer formed over the glass flake; and
fine gold particles deposited on the titanium oxide layer, wherein
the fine gold particles comprise fine gold particles P1 having a particle diameter of less than 20 nm, fine gold particles P2 having a particle diameter of 20 nm or more and less than 50 nm, and fine gold particles P3 having a particle diameter of 50 nm or more;
in a square region 2 μm on a side on a surface of the titanium oxide layer on which the fine gold particles are deposited, the number of the fine gold particles P2 is 9 or more and less than 100 and an average of distances between the fine gold particles P2 is 130 nm or more and less than 500 nm, each of the distances being a distance from one of the fine gold particles P2 to another fine gold particle P2 nearest to the one fine gold particle P2; and the number of the fine gold particles P3 is less than 40% of the sum of the number of the fine gold particles P1 and the number of the fine gold particles P2.

2. The glitter pigment according to claim 1, wherein in the region, the number of the fine gold particles P1 is less than 100 and is more than 60% of the number of the fine gold particles P2.

3. The glitter pigment according to claim 1, wherein in the region, the number of the fine gold particles P3 is less than 120% of the number of the fine gold particles P2.

4. The glitter pigment according to claim 1, wherein the number of the fine gold particles P2 is 15 or more in the region.

5. The glitter pigment according to claim 1, wherein a reflected color, as measured using illuminant D65, is represented by a C* value of 13 or more in an L*C*h color system.

6. The glitter pigment according to claim 5, wherein the reflected color is represented by a h value of 30 or less or 330 or more in the color system.

7. The glitter pigment according to claim 6, wherein the C* value is 23 or more.

8. The glitter pigment according to claim 5, wherein the reflected color is represented by a h value in the range of 150 to 300 in the color system.

9. The glitter pigment according to claim 1, comprising no silica layer having direct contact with the fine gold particles.

10. A pigment-containing composition, comprising the glitter pigment according to claim 1.

11. A pigment-containing painted product, comprising a substrate material and a paint film formed on the substrate material, the paint film containing the glitter pigment according to claim 1.

12. A glitter pigment, comprising:
a glass flake;
a titanium oxide layer formed over the glass flake; and
fine gold particles deposited on the titanium oxide layer, wherein
the fine gold particles comprise fine gold particles P2 having a particle diameter of 20 nm or more and less than 50 nm, and fine gold particles P3 having a particle diameter of 50 nm or more;
in a square region 2 μm on a side on a surface of the titanium oxide layer on which the fine gold particles are deposited, the number of the fine gold particles P2 is 9 or more and less than 100 and an average of distances between the fine gold particles P2 is 130 nm or more and less than 500 nm, each of the distances being a distance from one of the fine gold particles P2 to another fine gold particle P2 nearest to the one; and the number of the fine gold particles P3 is less than 120% of the number of the fine gold particles P2.

13. The glitter pigment according to claim 12, wherein the fine gold particles further comprise fine gold particles P1 having a particle diameter of less than 20 nm, and in the region, the number of the fine gold particles P1 is less than 100 and is more than 60% of the number of the fine gold particles P2.

14. The glitter pigment according to claim 12, wherein the number of the fine gold particles P2 is 15 or more in the region.

15. The glitter pigment according to claim 12, wherein a reflected color, as measured using illuminant D65, is represented by a C* value of 13 or more in an L*C*h color system.

16. The glitter pigment according to claim 15, wherein the reflected color is represented by a h value of 30 or less or 330 or more in the color system.

17. The glitter pigment according to claim 16, wherein the C* value is 23 or more.

18. The glitter pigment according to claim 15, wherein the reflected color is represented by a h value in the range of 150 to 300 in the color system.

19. The glitter pigment according to claim 12, comprising no silica layer having direct contact with the fine gold particles.

* * * * *